Patented Sept. 14, 1954

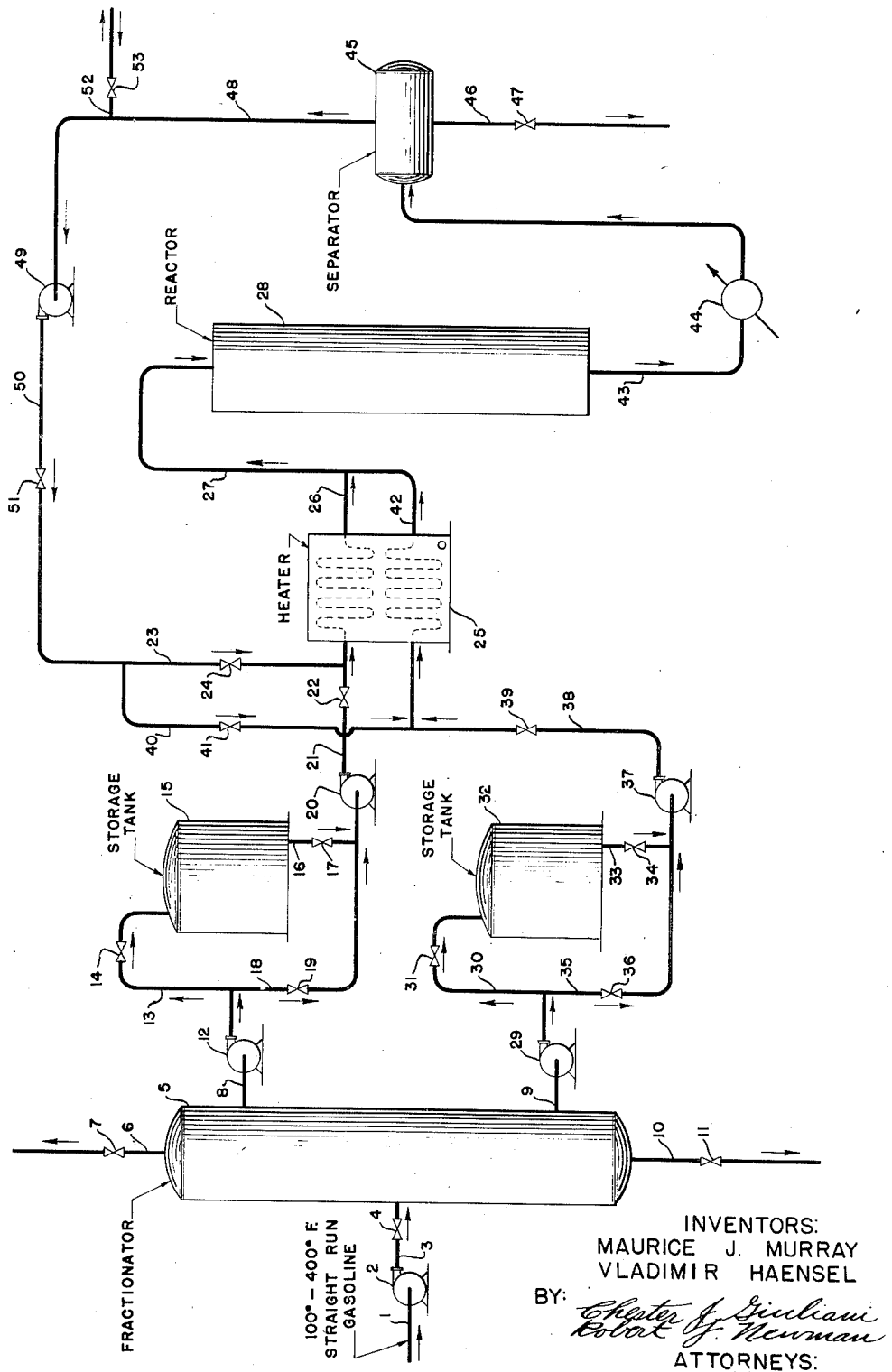

2,689,208

UNITED STATES PATENT OFFICE 2,689,208

HYDROCARBON CONVERSION PROCESS

Maurice J. Murray, Naperville, and Vladimir Haensel, Hinsdale, Ill., assignors to Universal Oil Products Company, Chicago, Ill., a corporation of Delaware Application January 31, 1951, Serial No. 208,736

4 Claims. (Cl. 196—50)

This invention relates to the catalytic conversion of hydrocarbons. It is more particularly concerned with a specific method of converting straight-run gasolines and fractions thereof in the presence of catalysts comprising alumina containing minor proportions of combined halogen and a member of the platinum group.

Catalysts comprising alumina, a member of the platinum group, particularly platinum, and combined halogen, particularly combined fluorine and combined chlorine, are especially useful in the reforming of hydrocarbons. Hydrocracking of paraffins, dehydrogenation of naphthenes, and isomerization, particularly of paraffins and alkylcyclopentanes, are among the principal reactions that are promoted by these catalysts, which are capable of increasing the octane number of straight-run gasolines and naphthas to values that are substantially higher than those that ordinarily can be reached by thermal reforming. In addition, the yield-octane number relationships realized with these catalysts are much better than are the corresponding relationships obtained in thermal reforming and in most of the prior catalytic reforming processes. These catalysts are very effective naphthene dehydrogenation catalysts, and by charging a suitable hydrocarbon fraction, aromatic concentrates can be produced. By an appropriate selection of operating conditions, these catalysts can be used for a number of weeks and even months without regeneration. We have invented a particular method of utilizing these catalysts in the reforming of straight-run gasolines and the like, and in the production of aromatics concentrates.

It is an object of the present invention to increase the octane number of low octane gasolines and fractions thereof.

It is another object of this invention to produce high yields of benzene from methylcyclopentane and/or cyclohexane and from fractions containing the same.

A further object of this invention is to obtain a long nonregenerative catalyst life when processing hydrocarbon fractions containing methylcyclopentane and/or cyclohexane to produce benzene in the presence of catalyst comprising platinum, alumina, and combined halogen.

A still further object of this invention is to produce higher yields of reformed gasolines having lower volatilities than normally are produced in reforming processes employing catalysts comprising platinum, alumina, and combined halogen.

In a broad aspect our invention comprises catalytically processing a hydrocarbon fraction containing naphthenes at low pressures that favor the dehydrogenation of naphthenes to the corresponding aromatics but which also tend to result in relatively rapid catalyst deactivation, and, after the catalyst has lost a measurable amount of activity, processing a hydrocarbon fraction containing naphthenes at a higher pressure over the same catalyst in order to at least partially restore the activity of the catalyst.

In one embodiment our invention relates to a process which comprises alternately contacting (a) hydrogen and a naphthene-containing hydrocarbon charging stock boiling approximately within the gasoline range at a pressure of from about 50 to about 400 p. s. i. and a temperature of from about 750° F. to about 1000° F. and (b) hydrogen and a naphthene-containing hydrocarbon charging stock boiling approximately within the gasoline range at a pressure of at least about 500 p. s. i. and a temperature of from about 750° F. to about 1000° F., with a catalyst comprising alumina containing a minor amount of combined halogen and a member of the platinum group.

In a more specific embodiment our invention relates to a process which comprises alternately contacting (a) hydrogen and a first hydrocarbon fraction containing an appreciable amount of methylcyclopentane and cyclohexane at a pressure of from about 50 to about 400 p. s. i. and a temperature of from about 750° F. to about 1000° F. and (b) hydrogen and a second hydrocarbon fraction containing an appreciable amount of naphthenes containing more than six carbon atoms per molecule at a pressure of at least about 500 p. s. i. and a temperature of from about 750° F. to about 1000° F., with a catalyst comprising alumina containing about 0.05–1.5% platinum and about 0.1–3.0% combined halogen selected from the group consisting of combined fluorine and combined chlorine.

The hydrocarbon stocks that may be reformed in accordance with our process comprise hydrocarbon fractions containing naphthenes and paraffins. The preferred stocks are those consisting essentially of naphthenes and paraffins although in some cases aromatics and/or olefins may also be present. This preferred class includes straight-run gasolines, by which term we mean to include natural gasolines and other uncracked hydrocarbon fractions boiling generally within the gasoline range and containing paraffins and naphthenes. Thermally cracked or reformed gasolines occasionally may be employed alone but more generally in admixture with straight-run gasoline. The gasoline usually will be a full boiling range gasoline having an initial boiling point within the range of from about 50° to about 150° F. and an end boiling point within the range of from about 325° to about 425° F. We may process such a full boiling range gasoline at pressures within the range of from about 50 to about 400 p. s. i. and, after the activity of the catalyst has declined, processing of the gasoline may be continued at a higher pressure to at least partially restore the activity of the catalyst. A relatively wide boiling naphtha such as a 200-400° F. naphtha may be processed in the same manner.

Alternatively, it frequently is desirable to process a hydrocarbon fraction containing an appreciable amount of naphthenes containing six carbon atoms per molecule with at least five carbon atoms in the ring at low pressure and thereafter process the same fraction or, preferably, a higher boiling fraction, at higher pressures until at least a portion of the catalyst activity is restored. Hydrocarbons boiling below about 150° F. in straight-run gasolines usually have relatively high octane numbers and, therefore, are less susceptible to up-grading in our process. For this reason, we ordinarily fractionate full boiling range gasoline charging stocks to remove hydrocarbons boiling up to about 150° F. The fraction boiling between about 150° F. and about 185° F. contains the bulk of the methylcyclopentane and cyclohexane, both of which are convertible to benzene in our process. There are a number of reasons why it is advantageous to process this fraction at low pressures. The first of these is that low pressure operation results in much higher conversions of these naphthenes to the corresponding aromatic hydrocarbons. This is for the reason that the naphthene-aromatic equilibrium at low pressures favors aromatic formation. This is shown by the fact that at a total pressure of 700 p. s. i. g. and a given set of reforming conditions within the ranges outlined herein, the conversion of methylcyclopentane to benzene was only 10% and the conversion of cyclohexane to benzene was only 50% in the presence of a catalyst of the type herein described. On the other hand, at a total pressure of 150 p. s. i. g., with the other operating conditions essentially unchanged, the conversion of methylcyclopentane to benzene was 90% and the conversion of cyclohexane to benzene was 100%. The effect of pressure on the equilibrium is much more pronounced in the case of methylcyclopentane and cyclohexane than it is in the case of higher molecular weight naphthenes, i. e., increasing the pressure from say 150 pounds to 700 pounds will decrease the conversion of methylcyclopentane and cyclohexane to benzene much more drastically than it will the conversion of methylcyclohexane to toluene.

Another reason for processing the 150-185° F. fraction at relatively low pressures, which necessarily means relatively low hydrogen partial pressures, is that this pressure condition tends to minimze hydrocracking, i. e., ring opening, of naphthenes. Ring opening of naphthenes results in a potential loss of octane number with the result that in order to obtain a given high octane number product, it is necessary to hydrocrack to a somewhat greater extent than would be necessary if all of the potential aromatics were produced. Hydrocracking is a very efficient way of increasing the yield as well as the octane number provided it is carried out to only a limited degree, since at higher hydrocracking conversions the yield falls off rapidly. The increased hydrocracking that would be necessary to compensate for the loss of potential octane number caused by ring opening of naphthenes originally present in the charging stock would result in a lower yield of a gasoline product having a relatively high volatility, i. e., higher than is desired by some refiners who have natural gasoline or butanes and pentanes to blend into the reformate. By selectively converting the naphthenes to aromatic hydrocarbons, ring opening, loss of potential aromatics, is minimized.

The foregoing reasons are applicable to the processing of hydrocarbon fractions boiling up to about 280° F. That is, fractions containing naphthenes convertible to toluene and xylenes often are more advantageously procesed at comparatively low pressures. However, the advantages to be gained with these stocks are not as great as in the case of stocks containing principally methylcyclopentane and cyclohexane, because pressure has a smaller effect on the equilibrium with the heavier naphthenes. On the other hand, higher boiling naphthas must be subjected to conditions that not only promote dehydrogenation of naphthenes to the corresponding aromatic hydrocarbons, but which also promote hydrocracking of the low octane number paraffins to lower boiling higher octane number paraffins. These hydrocracking conditions comprise total pressures of 500 pounds or greater and hydrogen/hydrocarbon molal ratios substantially greater than 1, conditions that result in an appreciable hydrogen partial pressure in the reaction zone. As hereinbefore stated these higher pressures have only a relatively small adverse effect upon the naphthene-aromatic equilibrium with the relatively high molecular weight naphthenes involved, but they definitely tend to restore catalyst activity.

Processing of hydrocarbon fractions, such as a 150-185° F. fraction, at low pressures, such as from 50 to about 400 p. s. i., possesses the disadvantage of tending to result in more rapid catalyst deactivation than would be encountered at higher pressures. In general, this greater deactivation is associated with a greater rate of deposition of carbonaceous material on the catalyst. We have found that by alternately processing at low pressures and at high pressures, catalyst deactivation can be minimized and relatively long nonregenerative catalyst life obtained, i. e., substantially longer than would be obtained at low pressure only. In general, we operate at relatively low pressures until a detectible amount of catalyst deactivation has occurred; thereafter we operate at higher pressures until at least a portion of the catalyst activity that has been lost at the low pressure operation, has been restored. As hereinbefore stated, the same charging stock may be employed at both the low pressure and the high pressure operations, or, on the other hand, a relatively low boiling fraction such as the 150-180° F. fraction may be processed at the low pressure, and a higher boiling fraction may be processed at the higher pressure.

During the low pressure portion of our operation, the total pressure should lie within the range of from about 50 to about 400 p. s. i. During the high pressure portion of our operation, the pressure should be at least 500 p. s. i., however, in general it will not exceed about 1200 p. s. i. During both portions of our operation, the temperatures should lie within the range of from about 750° F. to about 1000° F.; the weight hourly space velocity, defined as the weight of hydrocarbon charge per hour per weight of catalyst in the reaction zone, should lie within the range of from about 0.5 to about 40, and usually between about 2 and 10. The hydrogen to hydrocarbon molal ratio ordinarily will lie within the range of from about 2 to about 6 during the low pressure operation and between about 4 to 12 at the higher pressure operation, that is, we find it advantageous to maintain a higher hydrogen/hydrocarbon ratio during the high pressure operation.

The catalyst that is used in our process comprises alumina containing minor amounts of combined halogen and a member of the platinum group, i. e., ruthenium, rhodium, palladium, osmium, iridium, and platinum. A preferred type of catalyst comprises platinum-alumina-combined halogen catalyst of the type described in U. S. Patent No. 2,479,109, issued August 16, 1949. These catalysts may contain substantial amounts of platinum, but, for economic as well as for product yield and quality reasons, the platinum content usually will be within the range of from about 0.05–1.5%. These catalysts also contain relatively minor amounts of halogen, especially fluorine and chlorine. On a dry alumina basis the halogen content usually will be within the range of from about 0.1% to about 3%. The precise manner in which the halogen is present in the catalyst is not known, but it is believed to be combined with one or more of the other constituents. Consequently, it is often referred to as combined halogen.

One method of preparing catalysts used in our process comprises adding a suitable alkaline reagent such as ammonium hydroxide or carbonate to a salt of aluminum, such as aluminum chloride, aluminum sulfate, aluminum nitrate, and the like, in an amount sufficient to form aluminum hydroxides, which upon drying, are converted to alumina. The halogen may be added to the resultant slurry in the form of an acid such as hydrogen chloride or hydrogen fluoride, or as a volatile salt such as ammonium fluoride or ammonium chloride. Platinum, or one of the other metals of the platinum group, may be added to the alumina by adding hydrogen sulfide to chloroplatinic acid solution, for example, commingling the resulting solution with the halogen-containing alumina, and thereafter heating the resultant composite to a temperature of about 800° F. to about 1200° F. In general, the platinum-alumina-combined halogen catalysts that are used contain about 0.05–1.5% platinum and about 0.1–3.0% combined fluorine and/or combined chlorine.

One fixed bed method of conducting our invention comprises preheating hydrogen and the hydrocarbon charging stock to a conversion temperature, passing the same through a plurality of substantially adiabatic reaction zones containing a catalyst comprising alumina containing a minor amount of combined halogen and a member of the platinum group, at a low pressure. In the initial stage the reaction is endothermic, hence the reactant stream passing between said zones is reheated to the desired temperature. After the activity of the catalyst has declined significantly, the pressure may be raised and the same charge stock processed at a higher pressure or a different, usually a higher boiling, charge stock processed at the higher pressure. This sequence of operations is then continued.

The effluent from the catalyst reactors will be cooled, and the hydrogen separated from the condensed hydrocarbons and recycled to the reaction system.

Another type of fixed bed process that is suitable for our process comprises passing the hydrocarbon charging stock together with hydrogen through tubes containing catalyst, said tubes being subjected to radiant heat from a radiant flame and the resulting hot products of combustion. This type of operation is particularly suitable when the charging stock contains an appreciable amount of naphthenes, since the dehydrogenation of said naphthenes results in a highly endothermic heat of reaction.

Further features and advantages of our process will become apparent from the description of the flow diagram shown in the figure. In the figure, a full boiling range straight-run gasoline having an initial boiling point of 100° F. and an end boiling point of 400° F. is passed through line 1, is picked up by pump 2, is discharged into line 3 containing valve 4, and is passed into fractionator 5. A low boiling fraction having an end point of about 150° F. is removed overhead from fractionator 5 through line 6 containing valve 7, and is subsequently blended with reformed gasoline produced as hereinafter described. A light naphtha having a boiling range of from about 150° F. to about 185° F. is withdrawn from fractionator 5 through line 8. A heavy naphtha having a boiling range of from about 185° F. to about 390° F. is withdrawn from fractionator 5 through line 9. A small amount of bottoms is withdrawn from fractionator 5 through line 10 containing valve 11 and recycled to the crude distillation unit. The purpose of this bottoms stream is to insure that material boiling substantially about 400° F. is not charged to our reforming process, even though distillation in the crude column, wherein the 100–400° F. straight-run gasoline is prepared, is upset or the column is misoperated.

For purposes of simplicity, reflux condensers, receivers, and the like are omitted from the drawing although it is understood that they are to be employed in conjunction with fractionator 5.

The light naphtha withdrawn from fractionator 5 through line 8 is picked up by pump 12 and is discharged into line 13 containing valve 14 and passed into storage tank 15. The light naphtha may be stored in tank 15 during the periods when the heavy naphtha is being charged to the reforming reactor. When the light naphtha is being charged to the reforming reactor it may be withdrawn through line 16 containing valve 17, and/or it may be passed directly through line 18 containing valve 19. In either event, it will be picked up by pump 20 and discharged into line 21 containing valve 22, joined by a stream of recycle hydrogen prepared as hereinafter described, flowing through line 23 containing valve 24, and passed into heater 25. The combined stream of light naphtha and hydrogen are heated to a temperature within the range of from about 750° F. to about 1000° F., and the heated combined stream is withdrawn from heater 25 through line 26, passed into line 27 and thence into reactor 28.

Reactor 28 is shown as a single adiabatic reactor, although ordinarily 2, 3, or 4 adiabatic reactors with heaters therebetween will be employed. Reactor 28 contains a bed of 1/8" x 1/8" pellets of platinum-alumina-combined halogen catalyst having a platinum content of 0.3% and a fluorine content of 0.15%. When the light naphtha is being charged to the reactor the pressure will be maintained within the range of from about 50 to about 400 p. s. i. g. In this illustration, it is maintained at 150 p. s. i. The hydrogen to hydrocarbon molal ratio when processing the light naphtha is 3 to 1, the average catalyst temperature is 900° F., and the space velocity is 4.

The primary reaction that takes place in reactor 28 with the light naphtha at these operating conditions is a conversion of methylcyclopentane and cyclohexane to benzene. The conversion of these compounds to benzene ordinarily will be well over 75%. Because of the relatively low hydrogen partial pressure maintained in the reactor, there is very little ring opening, i. e., hydrocracking, of the naphthenes. In addition to the foregoing reaction, straight-chain and mildly branched paraffins are isomerized to their more highly branched isomers.

The activity of the catalyst will gradually decline when processing the light naphtha at these operating conditions. When the catalyst activity has reached a predetermined level, light naphtha may be switched out of the reactor and into storage tank 15, and heavy naphtha may then be charged to the reactor along with hydrogen. The heavy naphtha withdrawn from fractionator 5 through line 9 is picked up by pump 29 and is passed through line 30 containing valve 31 into storage tank 32. Heavy naphtha is withdrawn from storage tank 32 through line 33 containing valve 34, or it may be passed directly through line 35 containing valve 36. In either event, it is picked up by pump 37 and discharged into line 38 containing valve 39, is joined by a stream of recycle hydrogen, prepared as hereinafter described, flowing through line 40 containing valve 41, and the combined streams are passed into heater 25. The heated mixture of hydrogen and heavy naphtha is withdrawn from heater 25 through line 42 and is passed via line 27 into reactor 28.

When heavy naphtha is being charged to reactor 28 the operating conditions will be a pressure greater than about 500 p. s. i., in this illustration, it is 700 p. s. i. The hydrogen/hydrocarbon molal ratio is 6 to 1, the average catalyst temperature is 905° F., and the weight hourly space velocity is 3.5. The naphthenes in the heavy naphtha are dehydrogenated to the corresponding aromatic hydrocarbons, an appreciable portion of the higher boiling relatively straight chain paraffins are hydrocracked to lower molecular weight higher octane number paraffins, and isomerization of straight chain and mildly branched hydrocarbons to more highly branched hydrocarbons occurs. The processing of the heavy fraction is continued until the activity of the catalyst is restored to a predetermined value. It is possible that at extreme conditions within the ranges outline, the activity of the catalyst will not be completely restored when processing the heavy naphtha. However, at all conditions that are commercially practicable and economically attractive, we have found that the activity of the catalyst is restored at least in part by processing the heavy naphtha after the catalyst has been at least partially deactivated by processing the light naphtha at the low pressure conditions.

The effluent from reactor 28 is withdrawn through line 43, condenser 44, and is passed into separator 45, wherein hydrogen is separated from the liquid hydrocarbons. The liquid reformed hydrocarbons present in separator 45 are withdrawn through line 46 containing valve 47. Hydrogen is withdrawn from separator 45 through line 48, is picked up by compressor 49, and is returned to the reaction system via line 50 containing valve 51. Excess hydrogen is withdrawn, or make-up hydrogen is added, through line 52 containing valve 53.

The following example is given to further illustrate our invention, but it is not given for the purpose of unduly limiting the generally broad scope of said invention.

*Example*

A full boiling range straight-run gasoline having an F-1 clear octane number of 42 was fractionated to prepare a light fraction having an end point of 150° F., a light naphtha having a boiling range of 152° F.–186° F., and a heavy naphtha having a boiling range of 189° F.–395° F. The light naphtha, which contained 47% naphthenes, was passed through a bed of platinum-alumina-combined halogen catalyst comprising alumina containing 0.3% platinum and 0.15% fluorine at a pressure of 150 p. s. i., a hydrogen/hydrocarbon molal ratio of 2, a liquid hourly space velocity of 5, and an initial average catalyst temperature of 900° F. At these conditions, 80% of the methylcyclopentane and cyclohexane in the charge stock was converted to benzene. It was observed that during the course of the run the activity of the catalyst gradually declined, as shown by a lower conversion of methylcyclopentane and cyclohexane to benzene. The reaction temperature was increased to maintain the conversion essentially constant until the average catalyst temperature reached 910° F. At that time, 20 days from the start of the run, the 189° F.–395° F. heavy naphtha was substituted for the light naphtha and was processed at a pressure of 700 p. s. i., a hydrogen/hydrocarbon molal ratio of 6, a liquid hourly space velocity of 3, and an initial average catalyst temperature of 915° F. The F-1+3 cc. TEL octane number of the product at these conditions was 93.8. As processing of the heavy naphtha continued the octane number gradually increased. The reaction temperature was lowered in order to maintain the octane number of the product constant. When the reaction temperature had been lowered to 904° F., after 30 days from the start of the run, the charging of the heavy naphtha was discontinued and light naphtha was substituted therefor. It was then found that it was possible to obtain an 80% conversion of the methylcyclopentane and cyclohexane to benzene at an average catalyst temperature of 901° F.

The foregoing results show that the catalyst was gradually deactivated when processing the light naphtha at the conditions stated, and that the major portion of the catalyst activity was restored by processing the heavy naphtha at the stipulated conditions.

Further tests have shown that operating in the manner herein specified makes it possible to obtain higher yields of a given octane number product with a somewhat lower volatility than when the entire charging stock is processed at one time. This is for the reason that when the entire charge stock is processed at one time at the higher pressures that are necessary to prevent rapid catalyst deactivation, only a comparatively small percentage of the methylcyclopentane and cyclohexane are converted to benzene. Because of this loss of potential octane number, it is necessary to obtain a greater amount of hydrocracking in order to reach the desired octane number. This results in a more volatile gasoline and greater loss for a given octane number product. Thus, our two step operation with blending of the products results in greater yields of a given octane number product.

We claim as our invention:

1. A process which comprises fractionating gasoline containing naphthenes to separate therefrom a heavy naphtha fraction boiling above about 185° F. and a light naphtha fraction having a boiling range of from about 150° to about 185° F. and containing methylcyclopentane and cyclohexane; reforming said light fraction by passing the same with hydrogen through a body of reforming catalyst comprising alumina, combined halogen and a metal of the platinum group at a temperature of from about 750° to about 1000° F. and a pressure of from about 50 to about 400 pounds per square inch; continuing the passage of the light fraction through said catalyst body until the activity of the catalyst has noticeably declined; and thereafter passing said heavy fraction with hydrogen through said body of catalyst at a temperature of from about 750° to about 1000° F. and a pressure of at least 500 pounds per square inch until at least a detectable increase in activity of the catalyst is obtained.

2. The process of claim 1 further characterized in that said catalyst comprises alumina containing about 0.05–1.5% platinum and 0.1–3.0% combined fluorine.

3. The process of claim 1 further characterized in that said catalyst comprises alumina containing about 0.05–1.5% platinum and 0.1–3.0% combined chloride.

4. A process which comprises fractionating gasoline containing naphthenes to separate therefrom a heavy naphtha fraction boiling above about 185° F. and a light naphtha fraction having a boiling range of from about 150° to about 185° F. and containing methylcyclopentane and cyclohexane; passing said light fraction with hydrogen through a body of reforming catalyst comprising alumina, combined halogen and a metal of the platinum group at a temperature of from about 750° to about 1000° F., a pressure of from about 50 to about 400 pounds per square inch, a weight hourly space velocity of from about 0.5 to about 40 and a hydrogen to hydrocarbon molal ratio of from about 2 to about 6; continuing the passage of the light fraction through said catalyst body until the activity of the catalyst has noticeably declined; and thereafter passing said heavy fraction with hydrogen through said body of catalyst at a temperature of from about 750° to about 1000° F., a pressure of at least 500 pounds per square inch, a weight hourly space velocity of from about 0.5 to about 40 and a hydrogen to hydrocarbon molal ratio of from about 4 to about 12 until at least a detectable increase in activity of the catalyst is obtained.

References Cited in the file of this patent

UNITED STATES PATENTS

| Number | Name | Date |
|---|---|---|
| 2,322,863 | Marschner | June 29, 1943 |
| 2,324,165 | Layng | July 13, 1943 |
| 2,375,573 | Meier | May 5, 1945 |
| 2,479,110 | Haensel | Aug. 16, 1949 |
| 2,503,641 | Taylor | Apr. 11, 1950 |

OTHER REFERENCES

Kastens: "Industrial and Eng. Chem.," vol. 42, April 1950, page 586.